United States Patent
Goetz et al.

(10) Patent No.: US 11,273,824 B2
(45) Date of Patent: Mar. 15, 2022

(54) APPARATUS FOR ACTIVATING/DEACTIVATING A MOTOR VEHICLE SECURITY SYSTEM DURING A TURNING MANEUVER OF THE MOTOR VEHICLE

(71) Applicant: Bayerische Motoren Werke Aktiengesellschaft, Munich (DE)

(72) Inventors: Alexander Goetz, Munich (DE); Soeren Ungermann, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 174 days.

(21) Appl. No.: 16/545,416

(22) Filed: Aug. 20, 2019

(65) Prior Publication Data
US 2019/0367017 A1    Dec. 5, 2019

Related U.S. Application Data
(63) Continuation of application No. PCT/EP2018/061501, filed on May 4, 2018.

(30) Foreign Application Priority Data
May 4, 2017   (DE) .................. 10 2017 207 463.9

(51) Int. Cl.
*B60W 30/09*     (2012.01)
*B60W 10/18*     (2012.01)
(Continued)

(52) U.S. Cl.
CPC ............ *B60W 30/09* (2013.01); *B60W 10/18* (2013.01); *B60W 30/0953* (2013.01);
(Continued)

(58) Field of Classification Search
CPC .. B60W 30/09; B60W 10/18; B60W 30/0953; B60W 40/09; B60W 2530/10;
(Continued)

(56) References Cited

U.S. PATENT DOCUMENTS

| 8,942,904 B2 * | 1/2015 | Foerster | G08G 1/166 701/70 |
| 10,427,674 B2 * | 10/2019 | Flehmig | G08G 1/16 |

(Continued)

FOREIGN PATENT DOCUMENTS

| CN | 102765420 A | * | 11/2012 | .......... B60W 50/082 |
| CN | 105083261 A | * | 11/2015 | .............. B60L 15/20 |

(Continued)

OTHER PUBLICATIONS

Machine translation of CN-102765420-A (Year: 2012).*
(Continued)

*Primary Examiner* — Jeff A Burke
*Assistant Examiner* — Mohamad O El Sayah
(74) *Attorney, Agent, or Firm* — Crowell & Moring LLP

(57) ABSTRACT

An apparatus activates/deactivates a motor vehicle safety system during a turning maneuver. The safety system is designed to carry out a braking operation of the motor vehicle during a turning maneuver if a probability of a collision of the motor vehicle with oncoming traffic is equal to or greater than a determined threshold value. The apparatus includes a detection unit for detecting an actual driving behavior of the vehicle driver, a determining unit for determining whether the actual driver behavior corresponds to a predefined sporty driving behavior, and a control unit for deactivating the safety system prior to carrying out the braking operation when the actual driving behavior corresponds to a predefined sporty driving behavior.

16 Claims, 2 Drawing Sheets

(51) Int. Cl.
*B60W 30/095* (2012.01)
*B60W 40/09* (2012.01)
*B60W 50/10* (2012.01)

(52) U.S. Cl.
CPC ............ *B60W 40/09* (2013.01); *B60W 50/10* (2013.01); *B60W 2530/10* (2013.01); *B60W 2540/10* (2013.01); *B60W 2710/0666* (2013.01)

(58) Field of Classification Search
CPC ............. B60W 50/10; B60W 2540/10; B60W 2710/0666
See application file for complete search history.

(56) References Cited

U.S. PATENT DOCUMENTS

| | | |
|---|---|---|
| 2010/0263374 A1 | 10/2010 | Tanaka et al. |
| 2017/0031361 A1 | 2/2017 | Olson et al. |
| 2017/0113665 A1 | 4/2017 | Mudalige et al. |
| 2017/0113683 A1 | 4/2017 | Mudalige et al. |
| 2018/0270241 A1* | 9/2018 | Herrmann ............ B62D 15/021 |

FOREIGN PATENT DOCUMENTS

| | | |
|---|---|---|
| DE | 10 2009 053 705 A1 | 11/2010 |
| DE | 10 2012 009 555 A1 | 11/2012 |
| DE | 20 2013 008 112 U1 | 1/2015 |
| DE | 10 2016 113 903 A1 | 3/2017 |
| DE | 10 2016 119 265 A1 | 4/2017 |
| DE | 10 2016 119 486 A1 | 4/2017 |
| EP | 2 293 255 A1 | 3/2011 |
| KR | 20170019638 A * | 2/2017 |

OTHER PUBLICATIONS

Machine translation of KR-20170019638-A (Year: 2017).*
Machine translation of CN-105083261-A (Year: 2015).*
International Search Report (PCT/ISA/210) issued in PCT Application No. PCT/EP2018/061501 dated Oct. 12, 2018 with English translation (four (4) pages).
German-language Written Opinion (PCT/ISA/237) issued in PCT Application No. PCT/EP2018/061501 dated Oct. 12, 2018 (seven (7) pages).
German-language Search Report issued in counterpart German Application No. 10 2017 207 463.9 dated Oct. 27, 2017 with partial English translation (12 pages).

* cited by examiner

APPARATUS FOR ACTIVATING/DEACTIVATING A MOTOR VEHICLE SECURITY SYSTEM DURING A TURNING MANEUVER OF THE MOTOR VEHICLE

CROSS REFERENCE TO RELATED APPLICATIONS

This application is a continuation of PCT International Application No. PCT/EP2018/061501, filed May 4, 2018, which claims priority under 35 U.S.C. § 119 from German Patent Application No. 10 2017 207 463.9, filed May 4, 2017, the entire disclosures of which are herein expressly incorporated by reference.

BACKGROUND AND SUMMARY OF THE INVENTION

The present invention relates to an apparatus for activating/deactivating a safety system of a motor vehicle in the event of a turning maneuver of the motor vehicle. In addition, the present invention relates to a motor vehicle, in particular a passenger vehicle, having such an apparatus and to a method for activating/deactivating a safety system of a motor vehicle in the event of a turning maneuver of the motor vehicle.

To increase safety for the user, or the occupants, of a motor vehicle, automatic braking in the event of dangerous situations can be implemented in a motor vehicle, for example a passenger vehicle or a truck. Such situations include for example (surprising) braking by a motor vehicle ahead that the driver's own motor vehicle could crash into, or the driver's own motor vehicle turning and possibly colliding with other road users in the process. Such a turning maneuver also includes turning at a junction across an opposite lane, i.e. turning left in traffic driving on the right, turning right in traffic driving on the left.

To avoid colliding with the oncoming traffic, i.e. a motor vehicle approaching in the crossing lane, in the event of such turning maneuvers, turn assist systems causing the motor vehicle to brake automatically can be used in motor vehicles. To this end, it is possible for example for systems such as camera systems and/or radar systems to be used in order to determine whether there is a risk of collision and to initiate braking in the motor vehicle in the event of such a risk of collision.

Following engagement of a turn assist system with activation of the brake, the driver can be provided with the opportunity to abort the action along with braking by operating the gas pedal or another control unit of the motor vehicle and hence to use this for control. This abortion of the action is effected only after action has taken place. The driving behavior desired by the driver is not considered in such systems, which limits the autonomy of the driver.

Against this background, it is an object of the present invention to brake a motor vehicle in the event of a present risk of collision on the basis of the driving behavior of the driver in a simple and inexpensive manner.

Accordingly, an apparatus for activating/deactivating a safety system of a motor vehicle in the event of a turning maneuver of the motor vehicle is proposed. The safety system is configured to initiate a braking process of the motor vehicle in the event of the turning maneuver if a collision likelihood for the motor vehicle with oncoming traffic is equal to or greater than a defined threshold value.

So as not to limit the autonomy of the driver, the proposed invention involves the current driving behavior of the driver being taken into consideration. To this end, there is provision for a detection unit that detects the current driving behavior of the driver of the motor vehicle. A determination unit subsequently determines whether the current driving behavior is consistent with a predefined sporty driving behavior. If this is the case, a control unit deactivates the safety system before the braking process is initiated.

In this manner, an abort intention, i.e. the intention of the driver to abort the action of the safety system, including braking, and hence to use this for control, can be detected even before the actual action by the safety system in the event of turning and the safety system can be deactivated accordingly. The autonomy of the driver is therefore not limited.

Since a driver that currently wants to drive in a sporty and fast manner is frequently attentive and capable of good classification and assessment of particular traffic situations, the number of unwanted false triggerings of the safety system in the event of turning can be reduced, since such a driving behavior results in the safety system being deactivated. In addition, the satisfaction of the driver is increased, since sporty driving maneuvers consciously requested by him are not prevented by assistance systems.

In addition, safety is increased, since fewer braking actions unwanted by the driver take place and hence irritating situations with rash action as a consequence can be avoided. Safety is also increased by virtue of the motor vehicle initially not being slowed down, that is to say deceleration occurring, and, in the event of renewed acceleration by the driver, a collision subsequently still occurring that would not have taken place without the deceleration, i.e. the action by the safety system.

The safety system can for example use a camera to detect the oncoming traffic when the motor vehicle initiates a turning maneuver. Said turning maneuver can be detected on the basis of a steering wheel position, for example. The turning maneuver relates in this case particularly to turning at a junction across an opposite lane, i.e. turning left in traffic driving on the right, turning right in traffic driving on the left.

Subsequently, the safety system can take the detected oncoming traffic and properties of the motor vehicle, such as for example speed, as a basis for determining a risk of collision. In this case, for example the camera recording of the oncoming traffic, which can consist of multiple frames, can be used to determine a size and position of the approaching motor vehicle. Based on the size and position, the speed and acceleration of the oncoming traffic can then be calculated.

After the collision likelihood is determined, the safety system determines whether the calculated collision likelihood is equal to or greater than a defined threshold value. If this is the case, the safety system initiates a braking process of the motor vehicle, provided that this is not prevented by the apparatus, as described above.

The respective unit, for example detection unit or control unit, can be implemented in hardware and/or in software. In the case of a hardware implementation, the respective unit can be in the form of an apparatus or in the form of part of an apparatus, for example in the form of a computer or in the form of a microprocessor. In the case of a software implementation, the respective unit can be in the form of a computer program product, in the form of a function, in the form of a routine, in the form of part of a program code or in the form of an executable object.

According to one embodiment, the control unit is configured to reactivate the safety system after completion of the turning maneuver of the motor vehicle. As soon as the turning maneuver is complete, the safety system can therefore actively engage in the control or braking of the motor vehicle again in the event of further turning maneuvers.

According to a further embodiment, the detection unit is configured to detect at least one parameter of the motor vehicle. The detection unit can read and evaluate for example properties of the motor vehicle itself and/or signals indicating the current driving behavior.

The parameters can comprise for example a demanded torque requested by the driver and the vehicle mass. These two parameters allow the current driving behavior to be determined and an intention to start driving in a sporty manner to be detected without further information about the motor vehicle being needed. Alternatively, the accelerator pedal angle could also be used as information, but this is dependent on the motor vehicle and therefore this requires further information about the specific motor vehicle. If the demanded torque is used, this is independent of specific properties of the motor vehicle, which means that the apparatus can easily be used in different motor vehicles.

According to a further embodiment, the determination unit is configured to determine the current driving behavior on the basis of a logic combination of the demanded torque requested and the vehicle mass. By way of example, the current driving behavior can be consistent with the predefined sporty driving behavior if the ratio of demanded torque requested to vehicle mass is equal to or greater than a predefined value. This value can be stipulated on the basis of a user input.

In addition or as an alternative to the demanded torque requested and the vehicle mass, the parameters can comprise a current acceleration of the motor vehicle, an accelerator pedal angle and/or a steering angle.

According to a further embodiment, the determination unit is configured to determine the current driving behavior on the basis of a logic combination of the demanded torque requested and the vehicle mass and at least one parameter from among the current acceleration of the motor vehicle, the accelerator pedal angle and/or the steering angle. These further parameters allow the determination of the driving behavior to be improved.

According to a further aspect, a motor vehicle having an apparatus for activating/deactivating a safety system of the motor vehicle in the event of a turning maneuver of the motor vehicle as described above is proposed. The motor vehicle can in particular be a passenger vehicle.

According to a further aspect, a method for activating/deactivating a safety system of a motor vehicle in the event of a turning maneuver of the motor vehicle is proposed, wherein the safety system is configured to initiate a braking process of the motor vehicle in the event of the turning maneuver if a collision likelihood for the motor vehicle with oncoming traffic is equal to or greater than a defined threshold value. The method has the following steps: detecting a current driving behavior of a driver of the motor vehicle; determining whether the current driving behavior is consistent with a predefined sporty driving behavior; and deactivating the safety system before the braking process is initiated if the current driving behavior is consistent with a predefined sporty driving behavior.

The embodiments and features described for the proposed apparatus apply to the proposed method accordingly.

Additionally, a computer program product is proposed that has a program code designed to prompt the performance of the method as explained above on a computer.

A computer program product, such as e.g. a computer program, can be provided or delivered for example as a storage medium, such as e.g. a memory card, a USB stick, CD-ROM, DVD, or else in the form of a downloadable file from a server in a network. This can be effected for example in a wireless communication network by way of the transmission of an applicable file with the computer program product or the computer program.

Further advantageous configurations and aspects of the invention are the subject of the subclaims and of the exemplary embodiments of the invention that are described below. The invention is explained more specifically below on the basis of preferred embodiments with reference to the appended figures.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, elements that are the same or have the same function have been provided with the same reference signs, unless indicated otherwise.

Figure 1:
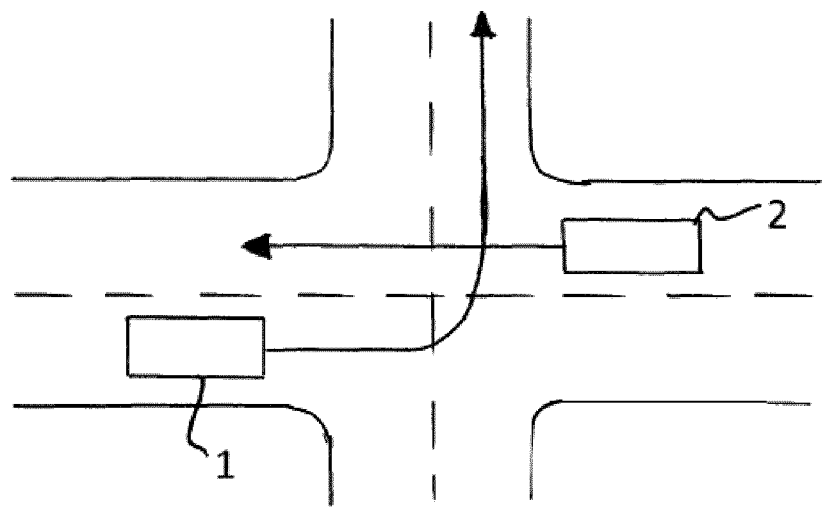
FIG. 1 is a schematic view of a junction with a motor vehicle and oncoming traffic present.
Figure 2:
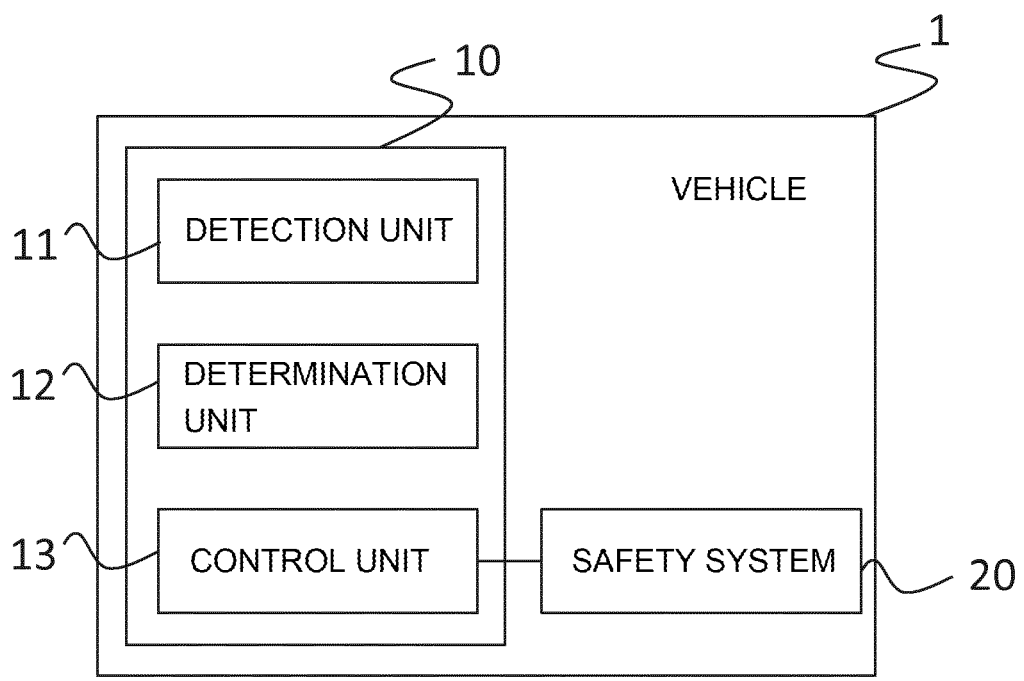
FIG. 2 is a schematic block diagram of the motor vehicle with an apparatus for activating/deactivating a safety system of the motor vehicle in the event of a turning maneuver of the motor vehicle.

FIG. 1 shows a junction with a motor vehicle 1 and a second motor vehicle 2 that is oncoming traffic for the first motor vehicle 1. In the event of a turning maneuver of the motor vehicle 1 to the left, i.e. across the lane of the second motor vehicle 2, a collision can occur, depending on the speed/acceleration of the two motor vehicles 1, 2.

To prevent such a collision, there is provision in the motor vehicle 1 for a safety system 20 for preventing a collision. Depending on the current driving behavior of the driver, however, it may be the intention for the safety system 20 not to initiate an automated braking process in the event of a risk of collision. This is the case, for example, when the driver drives in a very fast or sporty manner. In such a case, the driver could cancel a braking process already initiated by the safety system 20 by aborting. Since this leads to an unwanted deceleration in the event of the turning maneuver, however, there is provision in the motor vehicle 1 for an apparatus 10 for activating/deactivating the safety system 20 in order to be able to deactivate the safety system 20 on the basis of a current driving behavior of the driver.

In the example shown in FIG. 1, traffic driving on the right is assumed. The apparatus 10 for activating/deactivating the safety system 20 that is described below and the safety system 20 can likewise be used for traffic driving on the left, however.

The apparatus 10 has a detection unit 11, a determination unit 12 and a control unit 13.

Before the safety system 20 initiates a braking process in the event of a risk of collision with the oncoming traffic 2, the detection unit 11 detects the current driving behavior of the driver of the motor vehicle 1. To this end, the detection unit 11 can logically combine the demanded torque requested by the driver and the vehicle mass.

The determination unit 12 can subsequently determine whether the current driving behavior is consistent with a predefined sporty driving behavior. If the result of the logic combination is equal to or greater than a predefined value, the current driving behavior is detected as sporty driving behavior.

If the current driving behavior is consistent with the predefined sporty driving behavior, the control unit 13 deactivates the safety system 20 before the braking process is initiated. Following completion of the turning maneuver, the control unit 13 activates the safety system 20 again, so that it is available again for future turning maneuvers. In the event of any further turning maneuver, the current driving behavior is again checked for whether there is a sporty driving behavior, and only if this is the case is the safety system 20 deactivated again.

Figure 3:
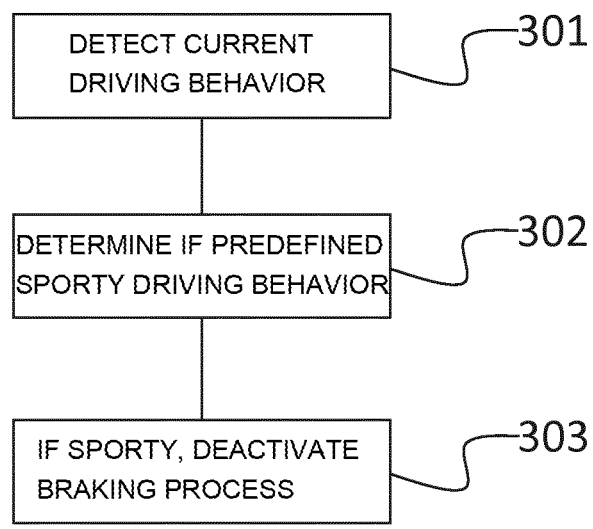
FIG. 3 is a schematic flowchart for a method for activating/deactivating a safety system of a motor vehicle in the event of a turning maneuver of the motor vehicle.

FIG. 3 shows a method for activating/deactivating the safety system 20 of the motor vehicle 1 in the event of a turning maneuver of the motor vehicle 1. The method has the following steps: in a first step 301, a current driving behavior of a driver of the motor vehicle 1 is detected; in a second step 302, it is then determined whether the current driving behavior is consistent with a predefined sporty driving behavior; and if this is the case, the safety system 20 is subsequently deactivated in a third step 303 before the braking process is initiated.

The proposed apparatus allows a safety system intended to prevent a collision with oncoming traffic in an automated manner to be adapted, i.e. activated or deactivated, on the basis of a current driving behavior of the driver. In this manner, it is possible for the autonomy of the driver to be increased while at the same time safety in road traffic is improved.

Although the present invention has been described on the basis of exemplary embodiments, it is modifiable in a wide variety of ways.

REFERENCE SIGNS

1 Motor vehicle
2 Oncoming traffic
10 Apparatus
11 Detection unit
12 Determination unit
13 Control unit
20 Safety system
301-303 Method steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An apparatus for activating/deactivating a safety system of a motor vehicle in an event of a turning maneuver of the motor vehicle, comprising:
    a processor;
    a memory in communication with the processor, the memory storing a plurality of instructions executable by the processor to cause the apparatus to:
        detect on the basis of a logic combination of at least two parameters a current driving behavior of a driver of the motor vehicle, wherein
            the at least two parameters comprise two or more of:
                a current acceleration of the motor vehicle,
                an accelerator pedal angle, or
                a steering angle;
        determine whether the current driving behavior is consistent with a predefined sporty driving behavior; and
        deactivate the safety system before a braking process is initiated if the current driving behavior is consistent with a predefined sporty driving behavior, wherein
            the safety system is configured to initiate the braking process of the motor vehicle in the event of the turning maneuver if a collision likelihood for the motor vehicle with oncoming traffic is equal to or greater than a defined threshold value.

2. The apparatus according to claim 1, wherein the memory further comprises instructions executable by the processor to cause the apparatus to reactivate the safety system after completion of the turning maneuver of the motor vehicle.

3. The apparatus according to claim 1, wherein
    the at least one parameter comprises a demanded torque requested by the driver and a vehicle mass.

4. The apparatus according to claim 3, wherein the memory further comprises instructions executable by the processor to cause the apparatus to determine the current driving behavior on the basis of a logic combination of the demanded torque requested and the vehicle mass.

5. The apparatus according to claim 4, wherein
    the current driving behavior is consistent with the predefined sporty driving behavior if a ratio of the demanded torque requested to the vehicle mass is equal to or greater than a predefined value.

6. The apparatus according to claim 5, wherein
    the at least one parameter further comprises one or more of: a current acceleration of the motor vehicle, an accelerator pedal angle, or a steering angle.

7. A motor vehicle, comprising:
    a safety system configured to initiate a braking process of the motor vehicle in an event of a turning maneuver if a collision likelihood for the motor vehicle with oncoming traffic is equal to or greater than a defined threshold value; and
    an apparatus for activating/deactivating the safety system, the apparatus comprising:
        a processor;
        a memory in communication with the processor, the memory storing a plurality of instructions executable by the processor to cause the apparatus to:
            detect a current driving behavior of a driver of the motor vehicle;
            determine whether the current driving behavior is consistent with a predefined sporty driving behavior; and
            deactivate the safety system before the braking process is initiated if the current driving behavior is consistent with a predefined sporty driving behavior.

8. The motor vehicle according to claim 7, wherein the memory further comprises instructions executable by the processor to cause the apparatus to reactivate the safety system after completion of the turning maneuver of the motor vehicle.

9. The motor vehicle according to claim 7, wherein the memory further comprises instructions executable by the processor to cause the apparatus to detect at least one parameter of the motor vehicle.

10. The motor vehicle according to claim 9, wherein
the at least one parameter comprises a demanded torque requested by the driver and a vehicle mass.

11. The motor vehicle according to claim 10, wherein the memory further comprises instructions executable by the processor to cause the apparatus to determine the current driving behavior on the basis of a logic combination of the demanded torque requested and the vehicle mass.

12. The motor vehicle according to claim 7, wherein
the current driving behavior is consistent with the predefined sporty driving behavior if a ratio of the demanded torque requested to the vehicle mass is equal to or greater than a predefined value.

13. The motor vehicle according to claim 12, wherein
the at least one parameter further comprises one or more of: a current acceleration of the motor vehicle, an accelerator pedal angle, or a steering angle.

14. A method for activating/deactivating a safety system of a motor vehicle in an event of a turning maneuver of the motor vehicle, the method comprising the acts of:
detecting a current driving behavior of a driver of the motor vehicle;
determining whether the current driving behavior is consistent with a predefined sporty driving behavior; and
deactivating the safety system before a braking process is initiated if the current driving behavior is consistent with a predefined sporty driving behavior, wherein
the safety system is configured to initiate the braking process of the motor vehicle in the event of the turning maneuver if a collision likelihood for the motor vehicle with oncoming traffic is equal to or greater than a defined threshold value.

15. The method according to claim 14, further comprising the act of:
reactivating the safety system after completion of the turning maneuver of the motor vehicle.

16. The method according to claim 14, wherein
the act of determining whether the current driving behavior is consistent with the predefined sporting driving behavior is carried out by determining whether a ratio of a demanded torque requested to a vehicle mass is equal to or greater than a predefined value.

* * * * *